(12) United States Patent  
Sugiyama

(10) Patent No.: US 7,784,945 B2  
(45) Date of Patent: Aug. 31, 2010

(54) DISPLAY APPARATUS, DISPLAY METHOD, DISPLAY PROGRAM, INTEGRATED CIRCUIT, GOGGLE-TYPE HEAD-MOUNTED DISPLAY, VEHICLE, MONOCLE, AND STATIONARY DISPLAY

(75) Inventor: Keiji Sugiyama, Kyoto (JP)

(73) Assignee: Panasonic Corporation, Osaka (JP)

( * ) Notice: Subject to any disclaimer, the term of this patent is extended or adjusted under 35 U.S.C. 154(b) by 22 days.

(21) Appl. No.: 12/264,437

(22) Filed: Nov. 4, 2008

(65) Prior Publication Data

US 2009/0115968 A1    May 7, 2009

(30) Foreign Application Priority Data

Nov. 5, 2007    (JP) .............................. 2007-286982

(51) Int. Cl.  
*A61B 3/14* (2006.01)
(52) U.S. Cl. ......................... 351/210; 351/209; 359/634
(58) Field of Classification Search .................. 359/13, 359/630, 634, 632; 351/209, 210; 345/8; 340/575, 576  
See application file for complete search history.

(56) References Cited

U.S. PATENT DOCUMENTS

2007/0273611 A1 * 11/2007 Torch .............................. 345/8

FOREIGN PATENT DOCUMENTS

| JP | 10-85248 | 4/1998 |
| JP | 10-301055 | 11/1998 |

* cited by examiner

*Primary Examiner*—Joseph Martinez  
(74) *Attorney, Agent, or Firm*—Wenderoth, Lind & Ponack, L.L.P.

(57) ABSTRACT

A display apparatus includes: a light outputting unit which outputs a visible beam to be projected onto an eyeball and an infrared beam to be projected onto eyelids; a deflection unit which deflects, toward the user's eyes, the visible beam and infrared beam outputted by the light outputting unit; a light sensing unit which senses the reflected light of the visible beam reflected off the user's eyeball; an eyelid opening and closing judgment unit which judges the open or closed state of the user's eyelids based on the result of the reflected light sensing by the light sensing unit; and an infrared-irradiation range control unit which changes the irradiation range of the infrared beam so that the eyelids are selectively irradiated with the infrared beam, by controlling the light outputting unit according to the open or closed state of the eyelids judged by is the eyelid opening and closing judgment unit.

18 Claims, 12 Drawing Sheets

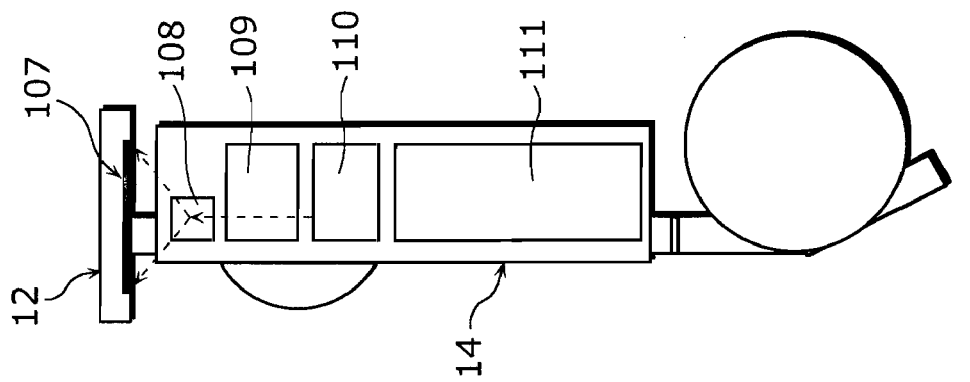
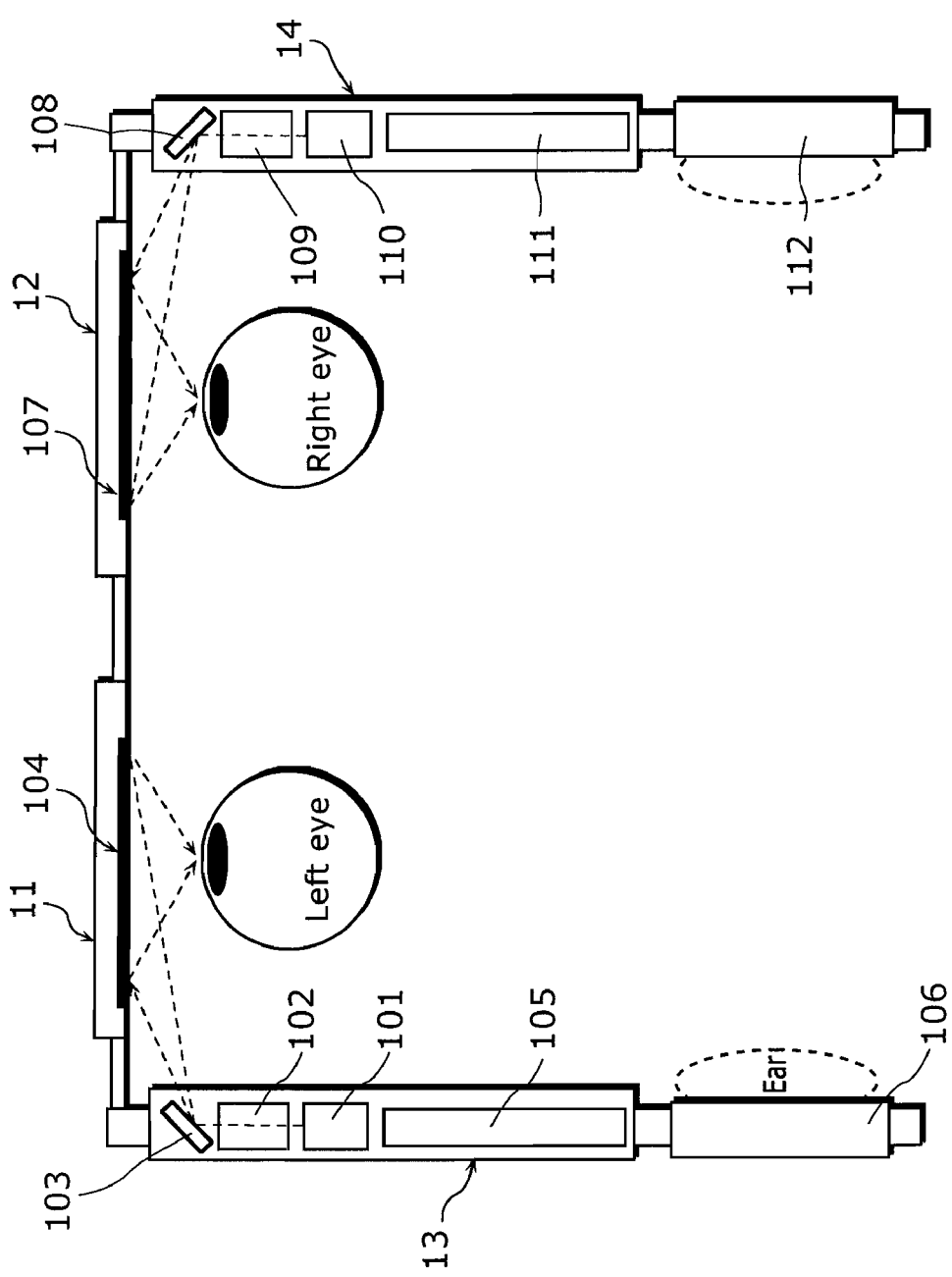
FIG. 1B
FIG. 1A

Defocused on retina

Focused on retina

DISPLAY APPARATUS, DISPLAY METHOD, DISPLAY PROGRAM, INTEGRATED CIRCUIT, GOGGLE-TYPE HEAD-MOUNTED DISPLAY, VEHICLE, MONOCLE, AND STATIONARY DISPLAY

BACKGROUND OF THE INVENTION (1) Field of the Invention

The present invention relates to a display apparatus such as a head-mounted display (HMD).

(2) Description of the Related Art

Conventionally, the method used for a display apparatus such as a head-mounted display (HMD) includes a method for performing direct drawing on the retina by two-dimensional scanning with a laser beam (hereinafter, described as a laser-scanning method). (For example, see Japanese Unexamined Patent Application Publication No. H10-301055.) The display apparatus according to the laser scanning method is also known as a: retinal scanning display (RSD), retinal irradiation display, retinal direct-draw display, laser scanning display, direct-view-type display, virtual retinal display (VRD), and so on.

FIGS. 1A and 1B show an exemplary structure of a goggle-type (eyeglass-type) HMD. The HMD shown in FIGS. 1A and 1B has goggle frames equipped with: light sources 101 and 110 which output laser beams; wavefront shape converting units 102 and 109 which control the wavefront of the laser beams; and scan units 103 and 108 which perform two-dimensional scanning with the laser beams. The laser beams are projected onto the goggle lenses by the scan units 103 and 108, and then reflected by deflection units 104 and 107 provided on the surface of the goggle lenses, and enter a user's eyes to form an image on the retina. Here, a half mirror or a hologram optical element (HOE) is used for the deflection units 104 and 107, so as to allow the user to visually recognize both the external world and an image drawn with the laser beams at the same time. In addition, used for the scan units 103 and 108 is a mirror device which performs two-dimensional laser scanning by oscillating a single-plate mirror in a uniaxial or biaxial direction.

In addition, a conventional microdisplay HMD has a structure in which a microdisplay such as a liquid display or an organic electroluminescence (EL) display, instead of a laser source, is used for the light source, and a deflection unit guides the light from the microdisplay to the user's eyes.

As in the case of common personal-computer displays, eye strain such as dry eyes is a problem in visual display terminal (VDT) operation.

One of the causes of dry eyes is the functional decline of meibomian glands. Meibomian glands are an organ secreting an oil film for covering the surface of the eyeball so as to prevent the evaporation of tears over the surface of the eyeball. FIG. 18 shows a cross-sectional view of a human eyeball with eyelids. As FIG. 18 shows, meibomian glands 303, located inside an upper eyelid 301 and a lower eyelid 302, secrete oil onto the surface of an eyeball 300 through a meibomian gland opening 304. A decline in the function of the meibomian glands causes deficiency of the oil film covering the surface of the eyeball 300, so that tears evaporate and eyes become dry easily. This, as a result, develops into syndromes known as dry eyes. In addition, the number of times of blinking decreases during the VDT operation, which makes tears on the surface of the eyeball 300 more likely to evaporate, resulting in a higher possibility of causing dry eyes.

To relieve such dry eye syndromes, conceived is a method for stimulating the meibomian glands using near-infrared rays so as to activate the function of the meibomian glands (For example, see Japanese Unexamined Patent Application Publication No. H10-85248).

Japanese Unexamined Patent Application Publication No. H10-85248 discloses stimulating the meibomian glands inside eyelids by wearing, on the eyes, eye pads on which infrared light-emitting diodes are arranged. This prevents the meibomian glands from developing into dysfunction, thereby preventing occurrence of dry eyes.

However, with such a configuration as mounting an infrared ray generation unit such as infrared diodes in front of the eyes, the user's sight is blocked. For this reason, with the apparatus disclosed in Japanese Unexamined Patent Application Publication No. H10-85248, it is not possible to stimulate the meibomian glands while continuing the VDT operation. This necessitates suspension of the operation while the meibomian glands are being stimulated, thereby causing a decrease in the efficiency of the operation using an HMD.

In addition, the appearance of the goggle-type HMD is detracted by a method that necessitates the mounting of infrared diodes for generating infrared rays to the frontal surface of a goggle-type HMD. In addition, for the user to visually recognize the image, visible rays should enter the user's pupil, but the retina might be damaged if infrared rays enter the user's pupil at the time. For this reason, in safety terms, it is not preferable to project visible lights and infrared rays onto the eyes in the same manner.

This point is not considered in the above-described exemplary cases from the prior art, such as the laser scanning HMD or the eye pads for stimulating the meibomian glands.

SUMMARY OF THE INVENTION

The present invention is conceived for solving the problem described above, and it is an object of the present invention to preserve the external appearance of a goggle-type HMD, and to prevent, by stimulating the meibomian glands while carrying out VDT operations, eye strain without interrupting the operation of the user.

In order to solve the conventional problem described above, the display apparatus according to the present invention includes: a light outputting unit which outputs a visible beam to irradiate an eyeball with and an infrared beam to irradiate an eyelid with; a deflection unit which deflects, toward eyes of a user, the visible beam and the infrared beam outputted from the light outputting unit; a light sensing unit which senses reflected light of the visible beam that has been reflected off an eyeball of the user; an eyelid opening and closing judgment unit which judges whether eyelids of the user are in an open or closed state, based on a result of the reflected light sensing performed by the light sensing unit; and an infrared-irradiation range control unit which changes an irradiation range of the infrared beam so that the eyelids are selectively irradiated with the infrared beam, by controlling the light outputting unit according to the open or closed state of the eyelids judged by the eyelid opening and closing judgment unit. With this configuration, it is possible to stimulate the meibomian glands inside the eyelids while preventing the infrared beam from entering the eye, thereby relieving dry eyes without interrupting the visual recognition by the user with an HMD. Note that the above-described "eye" means a region including an eyeball, an upper eyelid, and a lower eyelid of the user.

In addition, the eyelid opening and closing judgment unit holds a relationship between a quantity of the reflected light and an eyelid opening rate indicating the open or closed state of the eyelids of the user, and determines the eyelid opening rate based on the quantity of the reflected light sensed by the light sensing unit, and the infrared-irradiation range control unit may change the irradiation range of the infrared beam in proportion to the eyelid opening rate determined by the eyelid opening and closing judgment unit. With this configuration, it is possible to reduce the possibility of the infrared beam being incident on the eyeball of the user.

In addition, the infrared-irradiation range control unit may fix an upper limit position of an upper irradiation range corresponding to an upper eyelid and a lower limit position of a lower irradiation range corresponding to a lower eyelid, and change the irradiation range by shifting a lower limit position of the upper irradiation range and an upper limit position of the lower irradiation range. With this configuration, it is possible to reduce the possibility of the infrared beam being incident on the eyeball of the user.

Furthermore, the display apparatus includes an infrared-irradiation method control unit which determines a method for infrared-beam irradiation within the irradiation range determined by the infrared-irradiation range control unit, and the infrared-irradiation method control unit may change, according to an irradiation position of the infrared beam, at least one of: intensity, a frequency of irradiation, and a wavefront shape of the infrared beam. With this configuration, it is possible to reduce harmful effects that might be given by the infrared beam onto the surface of the eyelids and the retina.

In addition, the infrared-irradiation method control unit may divide the irradiation range into an upper irradiation range corresponding to an upper eyelid and a lower irradiation range corresponding to a lower eyelid, and alternately irradiate the upper irradiation range and the lower irradiation range with an infrared beam. With this configuration, it is possible to reduce the possibility of a burn that might be caused when the surface of the eyelids are irradiated with the infrared beam for a long time.

In addition, the infrared-irradiation method control unit may divide, into plural lines in a vertical direction, the irradiation range determined by the infrared-irradiation range control unit, and alternately irradiate, with an infrared beam, an irradiation range corresponding to an odd line and an irradiation range corresponding to an even line. With this configuration, it is possible to reduce the possibility of a burn that might be caused when the surface of the eyelids are irradiated with the infrared beam for a long time.

In addition, the infrared-irradiation method control unit may convert the wavefront shape of the infrared beam according to a position at which the infrared beam is incident on the deflection unit, so as to prevent the infrared beam from being focused on one point. With this configuration, it is possible to reduce the possibility of damaging the retina when the infrared beam is incident on the eyeball of the user.

In addition, the infrared-irradiation method control unit may decrease an infrared-beam output when a distance to a lower limit position of an upper irradiation range corresponding to an upper eyelid is smaller, and decrease the infrared-beam output when a distance to an upper limit position of a lower irradiation range corresponding to a lower eyelid is smaller. With this configuration, it is possible to reduce the possibility of damaging the retina when the infrared beam is incident on the eyeball of the user.

In addition, the deflection unit may be formed using a hologram that deflects an incident beam into a different direction according to a wavelength of the incident beam. With this, it is possible to deflect, respectively, the visual beam to the eyeball of the user, and the infrared beam to the eyelids of the user.

In addition, the light outputting unit may include: a light source which outputs a beam; a wavefront shape conversion unit which converts a wavefront shape of the beam from the light source; and a scan unit which projects the beam from the wavefront shape conversion unit. With this, it is possible to display an image with beams while stimulating the meibomian glands inside the eyelids.

In addition, the light source may include: a red laser source which outputs a red laser; a blue laser source which outputs a blue laser; a green laser source which outputs a green laser by combining a semiconductor laser source and a wavelength conversion element, the semiconductor laser source outputting an infrared beam and the wavelength conversion element converting the infrared beam into the green laser; and an infrared laser source which includes an optical branching unit that branches part of the infrared beam outputted from the semiconductor laser source, and which outputs an infrared beam. With this configuration, it is possible to reduce the number of apparatus components, and to reduce the cost and the weight of the apparatus.

The display method according to the present invention includes: outputting a visible beam to irradiate an eyeball with and an infrared beam to irradiate an eyelid with; deflecting, toward eyes of a user, the visible beam and the infrared beam outputted in the outputting; sensing reflected light of the visible beam that has been reflected off an eyeball of the user; judging whether eyelids of the user are in an open or closed state, based on the result of the reflected light sensing performed in the sensing; and changing an irradiation range of the infrared beam so that the eyelids are selectively irradiated with the infrared beam according to the open or closed state of the eyelids judged in the judging.

The computer program according to the present invention causes a computer to execute: outputting a visible beam to irradiate an eyeball with and an infrared beam to irradiate an eyelid with; deflecting, toward eyes of a user, the visible beam and the infrared beam outputted in the outputting; sensing reflected light of the visible beam that has been reflected off an eyeball of the user; judging whether eyelids of the user are in an open or closed state, based on a result of the reflected light sensing performed in the sensing; and changing an irradiation range of the infrared beam so that the eyelids are selectively irradiated with the infrared beam according to the open or closed state of the eyelids judged in the judging.

The integrated circuit according to the present invention includes: a light outputting unit which outputs a visible beam to irradiate an eyeball with and an infrared beam to irradiate an eyelid with; a deflection unit which deflects, toward eyes of a user, the visible beam and the infrared beam outputted from the light outputting unit; a light sensing unit which senses reflected light of the visible beam that has been reflected off an eyeball of the user; an eyelid opening and closing judgment unit which judges whether eyelids of the user are in an open or closed state, based on a result of the reflected light sensing performed by the light sensing unit; and an infrared-irradiation range control unit which changes an irradiation range of the infrared beam so that the eyelids are selectively irradiated with the infrared beam, by controlling the light outputting unit according to the open or closed state of the eyelids judged by the eyelid opening and closing judgment unit.

Note that the present invention can be implemented not only as such a beam-scan display apparatus but also as an integrated circuit that implements the functions of the beam-scan display apparatus, or can be implemented as a program causing a computer to execute such functions. Furthermore, it goes without saying that such a program can be distributed through a recoding medium such as a CD-ROM and a transmission medium such as the Internet. In addition, the present invention can also be implemented as an integrated circuit which performs the functions of such a display apparatus.

The goggle-type head-mounted display according to the present invention includes: the display apparatus according to claim 1; a pair of lenses provided in front of the eyes of a user and each having the deflection unit in a side opposite to the eyes of the user; and a pair of temples each having one end connected to a corresponding one of the pair of lenses and the other end fixed to a lateral side of the head of the user.

The vehicle according to the present invention includes: the display apparatus according to claim 1 and a windshield having the deflection unit.

The monocle according to the present invention includes: the display apparatus according to claim 1 and an eyepiece lens having the deflection unit.

The stationary display according to the present invention includes: the display apparatus according to claim 1, a case for To housing the display apparatus, and the display surface provided on a surface of the case and configured with the deflection unit.

According to the invention, it is possible to preserve the external appearance of a goggle-type HMD, and to selectively irradiate the eyelids with an infrared beam. With this, it becomes possible to prevent the dysfunction of the meibomian glands without interrupting the operation by the user, thereby preventing eye strain.

FURTHER INFORMATION ABOUT TECHNICAL BACKGROUND TO THIS APPLICATION

The disclosure of Japanese Patent Application No. 2007-286982 filed on Nov. 5, 2007 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate specific embodiments of the invention. In the Drawings:

FIG. 1A is an elevation view of a beam-scan display apparatus in a first embodiment of the present invention;

FIG. 1B is a side view of the beam-scan display apparatus in the first embodiment of the present invention;

DESCRIPTION OF THE PREFERRED EMBODIMENTS

Hereinafter, embodiments of the present invention shall be described with reference to the drawings.

First Embodiment

Figure 2:
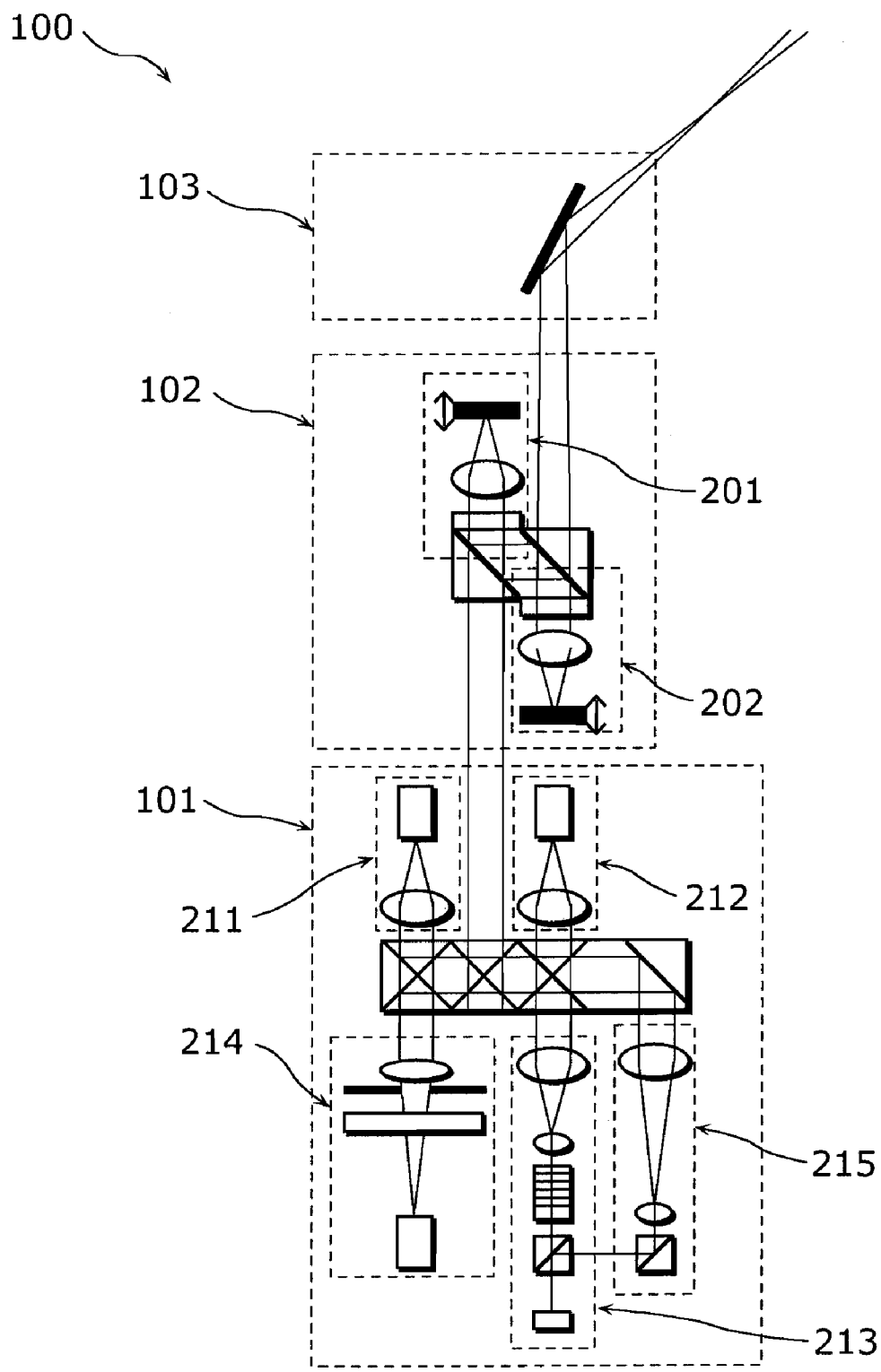
FIG. 2 is a detail configuration view of the beam-scan display apparatus in the first embodiment of the present invention.
Figure 3:
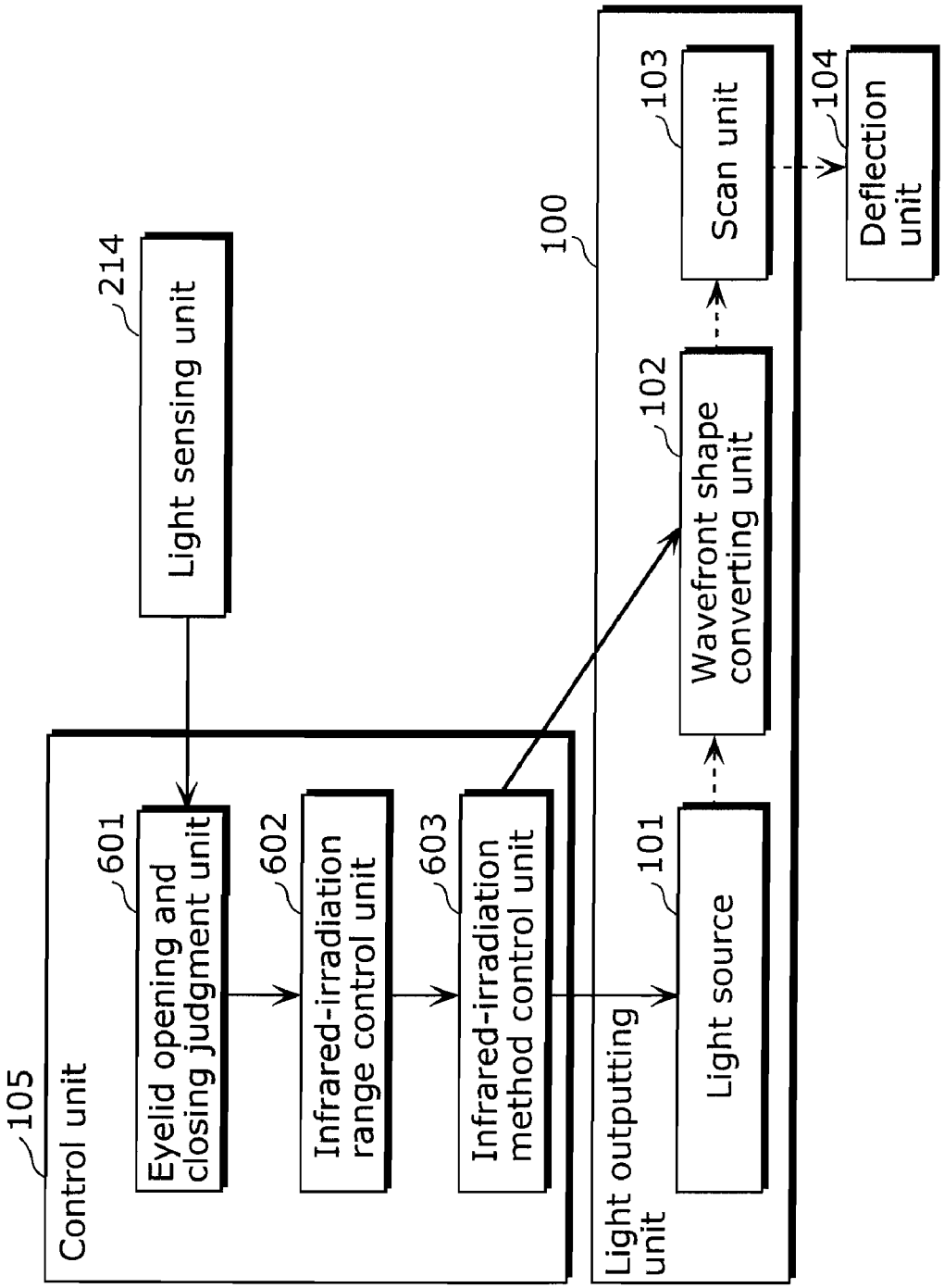
FIG. 3 is a functional block diagram of a control unit in the first embodiment of the present invention.

With reference to FIGS. 1 to 3, a goggle-type beam-scan display apparatus (head-mounted display: HMD) in a first embodiment of the present invention shall be described. Note that: FIG. 1A is an elevation view of the beam-scan display apparatus; FIG. 1B is a side view of the beam-scan display apparatus; FIG. 2 is a detail view of a portion of FIG. 1A; and FIG. 3 is a functional block diagram of the beam-scan display apparatus.

The goggle-type beam-scan display apparatus according to the first embodiment of the present invention includes: a pair of lenses 11 and 12 provided in front of the user's eyes, and a pair of temples 13 and 14 each having one end connected to a corresponding one of the lenses 11 and 12 and the other end fixed to each lateral side of the user's head.

As FIGS. 1A, 1B, and 2 show, the display apparatus includes: light sources 101 and 110; wavefront shape converting units 102 and 109; scan units 103 and 108, deflection units 104 and 107, control units 105 and 111, and headphone units 106 and 112. Note that a light outputting unit 100 is made up of: the light source 101, the wavefront shape converting unit 102, and the scan unit 103.

Note that in this embodiment, temples 13 and 14 hold the light sources 101 and 110, the wavefront shape converting units 102 and 109, the scan units 103 and 108, the control units 105 and 111, and the headphone units 106 and 112, with the deflection units 104 and 107 being provided on the lenses 11 and 12 respectively at a side opposite to the user's eyes.

The light sources 101 and 110 output a synthetic beam including a visible beam and an infrared beam. As FIG. 2 shows, the visible beam is turned into a laser beam of a given color through appropriate modulation of the output from a red laser source 211, a blue laser source 212, and a green laser source 213. Furthermore, through the modulation in association with the wavefront shape converting units 102 and 109, and with the scan units 103 and 108, which are to be described below, it is possible to display an image on the retina of the user's eyes. Meanwhile, the user's eyelids are irradiated with an infrared beam outputted from an infrared laser source 215.

Note that the green laser source 213 in the present embodiment outputs a green laser beam by combining a semiconductor laser source that outputs an infrared ray and a second-harmonic generation (SHG) element that converts the infrared ray into green. In addition, the infrared laser source 215 includes a half mirror (optical branching unit) that branches part of the infrared ray outputted from the semiconductor laser source included in the green laser source 213. In other words, the green laser source 213 and the infrared laser source 215 share the same semiconductor laser source that outputs infrared rays, thereby allowing reduction in the number of components and costs.

The configuration, however, is not limited to the above. A green semiconductor laser source may also be adopted for the green laser source 213, and a unique semiconductor laser source may also be adopted for the red laser source 215. In addition, each light source may also be: a solid-state laser, a liquid laser, a gas laser, and a light-emitting diode.

Note that each of the laser sources 211, 212, and 213 in FIG. 2 is equipped with a function to modulate laser beams; however, for modulating laser beams, a unit which modulates beams outputted from one of the laser sources 211, 212, and 213 may also be used in combination with each corresponding one of the laser sources 211, 212, and 213.

In addition, each of the light sources 101 and 110 in the present embodiment includes a light sensing unit 214 shown in FIG. 2. The light sensing unit 214 senses the light reflected from the retina of the user's eye. The light sensing unit 214 may be a semiconductor imaging device such as a charge coupled device (CCD), or may also be a photosensing element such as a photomultiplier and a photodiode may also be used. Note that the light sensing unit 214 may also sense the light reflected from the cornea. In this case, the sensing of the reflected light becomes easier since the cornea has a higher reflection rate with respect to the incident light than the retina.

Note that the light sensing unit 214 may also generate an image of the user's whole retina concurrently with the sensing of the light reflected from the retina. In this case, if some region on the retina presents an extremely low reflection rate, such as having a heavily-bleeding part under the influence of an eye disease and so on, this allows processing with consideration for the user's retinal condition in such a manner as not using the reflected light from the region for the judgment of the eyelid opening rate that is to be described below.

The wavefront shape converting units 102 and 109 control, within a predetermined range, the spot size of the beams deflected by the deflection units 104 and 107 that are to be described below, by varying the wavefront shapes of the respective beams outputted from the light sources 101 and 110. Hereinafter, the "spot size" of the beam is assumed as the spot size on the retina of the user's eye. The "wavefront shape" is a three-dimensional shape of a beam wavefront and includes planar, spherical, and aspherical shapes.

The wavefront shape converting unit 102 shown in FIG. 2 has a focal length horizontal component converting unit 201 and a focal length vertical component converting unit 202 arranged in series in an optical path. This makes it possible to separately convert the horizontal and vertical curvatures of the beam.

The focal length horizontal component converting unit 201 converts the horizontal curvature by changing the distance between a cylindrical lens and a mirror. The focal length vertical component converting unit 202 converts the vertical curvature by using a cylindrical lens disposed perpendicular to the cylindrical lens of the focal length horizontal component converting unit 201. In addition, both the focal length horizontal component converting unit 201 and focal length vertical component converting unit 202 convert a beam diameter along with changing of the curvature.

Note that it is possible to respond to the horizontal change more largely by changing the horizontal curvature more largely than the vertical curvature. This is particularly effective in the case where the horizontal view angle of the screen is intended to be made larger than the vertical view angle, or where the horizontal incident angle of the beam that is incident on the deflection units 104 and 107 from the scan units 103 and 108 is larger than the vertical incident angle, as in the case of an HMD having the scan units 103 and 108 on the lateral sides of the head.

Note that in FIG. 2, of the items representing wavefront shapes, only part of the wavefront shapes, that is, the horizontal curvature, vertical curvature, and the respective diameters thereof are changed; however, it is also applicable to provide a unit which changes, as other items, the distribution of curvatures within the wavefront, or the shape or the size of the wavefront edge.

In addition, the wavefront shape converting units 102 and 109 according to the present embodiment convert the wavefront shape using a cylindrical lens and a mirror; however, a variable shape lens such as a liquid-crystal lens and a liquid lens or an electro-optic device (EO device) may also be used. In this case, it is possible to convert the wavefront shape without moving the position of the device. In addition, it is possible to scale down the entire apparatus by using a diffractive element instead of the cylindrical lens.

The scan units 103 and 108 perform, respectively, two-dimensional scanning with beams from the wavefront shape converting units 102 and 109. The scan units 103 and 108 are a single-plate small mirror which can change angles two-dimensionally, and more specifically are a micro-electronic-mechanical-system (MEMS) mirror.

Note that the scan units 103 and 108 may be embodied as a combination of two or more types of scan units, such as a combination of a horizontal scan unit and a vertical scan unit.

The deflection units 104 and 107 deflect, respectively, the beams projected as scan beams from the scan units 103 and 108, into directions toward user's eyes. The deflection units 104 and 107 are designed so as to diffract and focus the beams from the scan units 103 and 108 onto the pupils of the user's eyes by forming, for example, a photopolymer layer on the internal side (on the eye side) of the goggle lenses 11 and 12 and then forming a lippmann volume hologram on the photopolymer layer. On the photopolymer layer, three holograms may be multiply-formed which reflect lights from the light sources 101 and 110 having the respective colors of red, green, and blue, or a trilayer hologram corresponding to lights of the respective colors may also be laminated.

In addition, it is possible to provide a transmissive display by manufacturing such that: only the lights having the wavelength of the light source is diffracted by using the wavelength selectivity of holograms, and the lights accounting for the major part of the light from the external world and having wavelengths other than the wavelength of the light source are not diffracted.

In addition, reflective performances of the deflection units 104 and 107 may be different between visible beams and infrared beams, by using the wavelength selectivity of holograms. In other words, beams incident on the deflection units 104 and 107 are deflected into different directions according to the wavelengths thereof.

More specifically, a hologram is formed such that the visible beam becomes incident on the user's eyeball to be focused on the retina, whereas a hologram is formed such that upper and lower eyelids, not the eyeball, are irradiated with the infrared beam. With this, it becomes possible to stimulate the meibomian glands with infrared beams while visually recognizing an image.

Note that the deflection units 104 and 107 are not limited to the use of a diffractive element such as a hologram, but may also be a mirror such as a concave mirror or a lens such as a convex lens. In addition, the method implemented in the deflection units 104 and 107 includes a method for diverting part of the diverging light from the screen toward the user's eyes, as with the case of a reflective screen or a transmission screen, as a result of the divergence of the beams reflected off the screen.

The control units 105 and 111 include an integrated circuit that controls each unit of the HMD. The control units 105 and 111 control: the laser output from the light sources 101 and 110, and the operations of the wavefront shape converting units 102 and 109 and of the scan units 103 and 108. FIG. 3 shows a functional block diagram of the control unit 105 in the present embodiment. Respective functional blocks from 601 to 603 in FIG. 3 shall be described below.

Note that the control units 105 and 111 may be equipped with a communication unit which receives a video and audio signal through wireless connection with a peripheral device such as a cellular phone. An image control unit included in each of the control units 105 and 110 may also have a memory in which an image to be presented to the user is stored, or may also obtain wirelessly, from another external device, the image to be presented to the user.

Note that it is sufficient that only one of the control units 105 and 111 is provided, and that either one of the control units 105 and 111 controls the operations of the light sources 101 and 110, the wavefront shape converting units 102 and 109, the scan units 103 and 108, and the headphone units 106 and 112 that correspond to the right and left eyes. In this case, it is possible to scale down the HMD, and to facilitate synchronizing images for the right and left eyes, and so on.

The headphone units 106 and 112 are equipped with speakers so as to output sound. Note that the headphone units 106 and 112 may be equipped with a battery to supply power to each unit in the HMD.

Note that each unit and part in FIG. 1 may be or may not be embedded in a single HMD. For example, all the units in FIG. 1 may be included in a single HMD, or the headphone units 106 and 112 may also be missing. In addition, each unit may be dispersedly provided. For example, the control units 105 and 111 may be partially included in the scan units 103 and 108 and the wavefront shape converting units 102 and 109. Each unit in FIG. 1 may be shared by plural devices. For example, the light sources 101 and 110 may be shared by two HMDs.

Hereinafter, in the beam-scan display apparatus shown in FIG. 1, an exemplary process for stimulating the meibomian glands by irradiating the eyelids with infrared beams shall be shown. Note that the present embodiment only describes the processing performed on the left eye of the user, but the same processing can also be performed on the right eye. The process for stimulating the meibomian glands is performed by execution of steps from S701 to S706 shown in FIG. 4.

(Step S701 Determining the Open or Closed State of Eyelids)

In this step, an eyelid opening and closing judgment unit 601 judges the degree of opening (the open or closed state) of the user's eyelids. In the present embodiment, the light sensing unit 214 senses the reflected light of a visible beam reflected off the user's eyeball and notifies the result of the sensing to the eyelid opening and closing judgment unit 601.

The eyelid opening and closing judgment unit 601 judges an eyelid opening rate X that represents the degree of opening of the user's eyes based on the quantity of reflected light, which is obtained from the light sensing unit 214. The eyelid opening rate X is determined as 1 when the eyelids are completely open, whereas the eyelid opening rate is determined as 0 when the eyelids are completely closed. In the present embodiment, the quantity of reflected light is assumed as an average value obtained with respect to a period during which the scan unit 103 performs one reciprocation in a low-speed scanning direction (during a period for completing the drawing of a frame of images).

Figure 5:
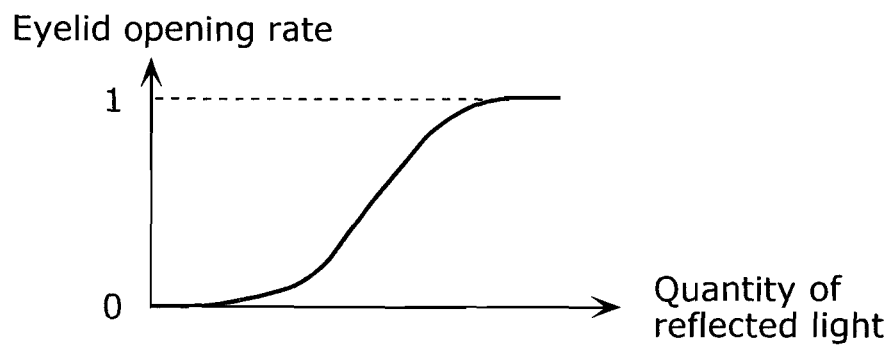
FIG. 5 is a diagram showing a relationship between a quantity of light reflected from the user's eyes and an eyelid opening rate in the first embodiment of the present invention.

FIG. 5 shows the relationship, used by the eyelid opening and closing judgment unit 601, between the quantity of reflected light and the eyelid opening rate X. The eyelid opening and closing judgment unit 601 judges, by holding the relationship shown in FIG. 5, the current eyelid opening rate X of the user based on the quantity of reflected light, which is obtained from the light sensing unit 214.

Figure 6:
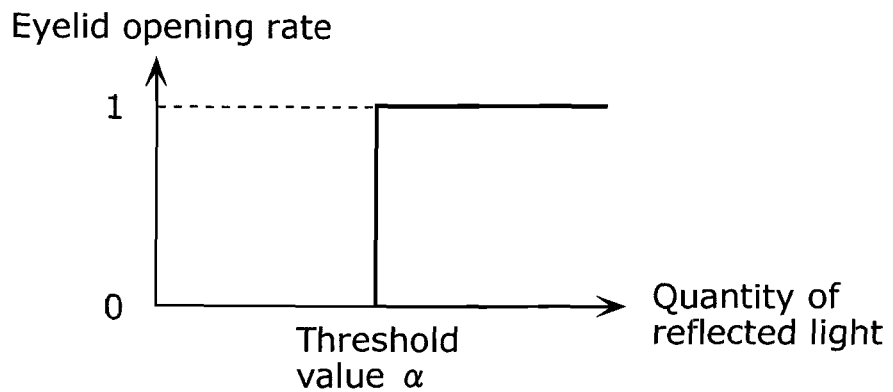
FIG. 6 is a diagram showing another example of the relationship between the quantity of reflected light and the eyelid opening rate.

Note that FIG. 5 shows an example where the relationship between the quantity of reflected light and the eyelid opening rate X is nonlinear, but a relationship in which the eyelid opening rate X is proportional to the quantity of reflected light may also be held. In addition, the following relationship may also be employed: when, as FIG. 6 shows, the quantity of reflected light exceeds a predetermined threshold value a, the eyelid opening rate X is assumed as 1, whereas in other cases the eyelid opening rate X is assumed as 0. In this case, it is possible, by simplifying the relationship, to reduce the amount of data held by the eyelid opening and closing judgment unit 601. In addition, since this limits the range of values adaptable for the eyelid opening rate X, it is possible to facilitate the processing after Step S702.

In addition, the quantity of reflected light need not be an average value with respect to a length of time during which the scan unit 103 draws a frame of images, but may also be an average value with respect to a predetermined length of time. For example, an average length of time for blinking by individual users may also be used as the time for judging the quantity of reflected light. In this case, it becomes possible to perform infrared-irradiation control appropriate for the characteristics of the eyelids of individual users.

In addition, the quantity of reflected light may also be obtained by using only reflected light from a specific region (for example, the retinal center, the macular region, or the corneal center), instead of using the reflected light from all the regions reflecting the scan beam. In this case, it is possible to control infrared irradiation considering the quantity of reflected light for an important region that has a possibility of causing, in case of any damage, a significant decrease in vision.

Furthermore, the quantity of reflected light may be judged by using only the reflected light of a beam having a predetermined wavelength, instead of measuring the reflected light of the beams outputted from all the light sources of the laser sources 211, 212, 213, and 215. For example, human lenses become clouded along with age, to be unable to transmit the light having a short wavelength. In this case, it is possible to reduce the processing cost required for sensing the reflected light, by measuring only the quantity of reflected light of the infrared ray having a long wavelength, without sensing the reflected light having a short wavelength from the start.

(Step S702 Determining an Infrared Irradiation Range)

In this step, an infrared-irradiation range control unit 602 determines the range for irradiating eyelids with infrared beams according to the eyelid opening rate X determined in the preceding step.

In the present embodiment, the irradiation range of an infrared beam to eyelids is changed by changing the vertical scan range of the infrared beam projected onto the deflection unit 104 from the scan unit 103.

Figure 7:
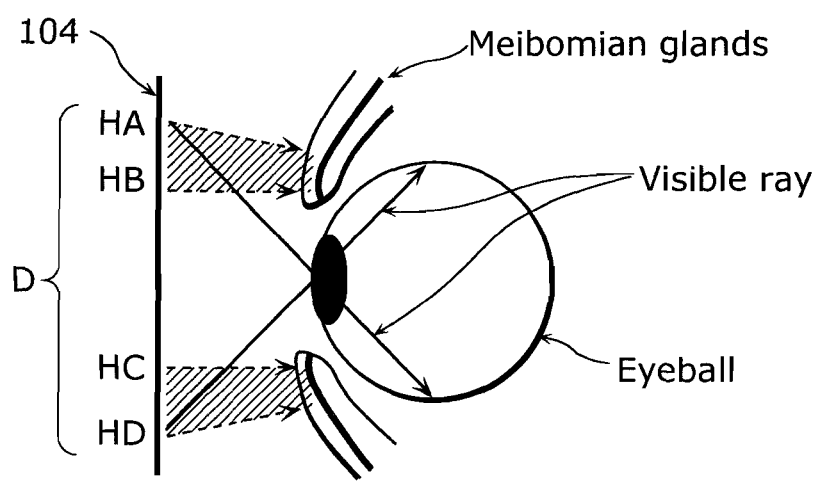
FIG. 7 is a diagram showing the irradiation range of an infrared beam when the eyelids are open at a maximum rate.

The infrared-irradiation range control unit 602 decreases the irradiation range of an infrared beam on the eyelids when the value of the eyelid opening rate X is larger, and increases the irradiation range of the infrared beam on the eyelids when the value of the eyelid opening rate X is smaller. FIG. 7 shows an exemplary irradiation range of an infrared beam where the eyelid opening rate X is maximum (where X is 1). FIG. 7 illustrates the infrared beam, projected by the scan unit 103, being reflected by the deflection unit 104 and then projected onto the user's eyelids.

The shaded region in FIG. 7 is a region through which the infrared beam reflected by the deflection unit 104 passes when the eyelids are irradiated with the infrared beam. Here, the irradiation range of the infrared beam includes: an upper irradiation range corresponding to the upper eyelid (a region sectioned along with HA-HB in FIG. 7) and a lower irradiation range corresponding to the lower eyelid (a region sectioned along with HC-HD). Then, for the upper irradiation range, the upper limit position is assumed as HA and the lower limit position as HB, whereas the upper limit position is assumed as HC and the lower limit position as HD for the lower irradiation range.

In other words, the upper eyelid is irradiated with an infrared beam through irradiation of an infrared beam to the region between HA and HB on the deflection unit 104, whereas the lower eyelid is irradiated with an infrared beam through irradiation of the infrared beam to the region between HC and HD on the deflection unit 104. In addition, it is possible to avoid the direct incidence of an infrared beam on the eyeball by not performing the irradiation of the infrared beam to the region between HB and HC on the deflection unit 104.

The infrared-irradiation range control unit 602 in the present embodiment controls the irradiation range of the infrared beam to upper and lower eyelids in accordance with the eyelid opening rate X. Specifically, the positions of HB and HC are changed with the positions of HA and HD on the deflection unit 104 being fixed. Here, the distance between HA and HB on the deflection unit 104 is represented by DU, and the distance between HC and HD is represented by DD. In addition, the distance between HB and HC is represented by DM, and the distance between HA and HD is represented by D.

When, as FIG. 7 shows, the eyelid opening rate X is 1, the infrared-irradiation range control unit 602 minimizes the irradiation range of the infrared beam to upper and lower eyelids. At the time, the distance between HA and HB is represented by DU1, and the distance between HC and HD is represented by DD1. Note that the values of DU1 and DD1 are held by the infrared-irradiation range control unit 602 from the start.

Figure 8:
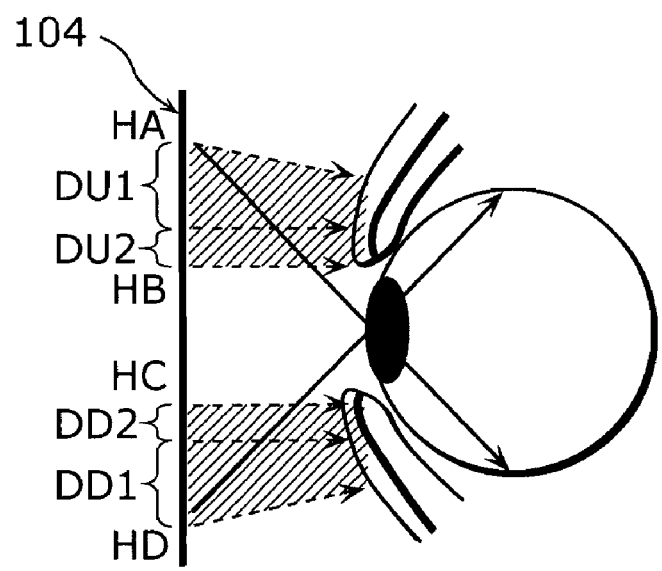
FIG. 8 is a diagram showing the irradiation range of an infrared beam when the eyelid opening rate is X.

FIG. 8 shows the positions of HB and HC when the eyelid opening rate is X. At the time, HB is positioned, at a distance of DU2, below an HB when the eyelid opening rate is 1. In addition, HC is likewise positioned, at a distance of DD2, above an HC when the eyelid opening rate is 1.

In the present embodiment, the infrared-irradiation range control unit 602 calculates the values of DU2 and DD2 in accordance with a relational expression shown in Expression (1).

[Expression 1]

$$DU2=DD2=DM\times(1-X)/2 \quad (1)$$

The infrared-irradiation range control unit 602 determines the irradiation range of the infrared beam to the upper and lower eyelids by setting the value of DU to the sum of DU1 and DU2 after obtaining the values of DU2 and DD2, and then setting, likewise, the value of DD to the sum of DD1 and DD2. The ranges of values of DU and DD are expressed by Expressions (2) and (3), respectively.

[Expression 2]

$$DU1 \leq DU=DU1+DU2 \leq D/2 \quad (2)$$

[Expression 3]

$$DD1 \leq DD=DD1+DD2 \leq D/2 \quad (3)$$

Figure 9:
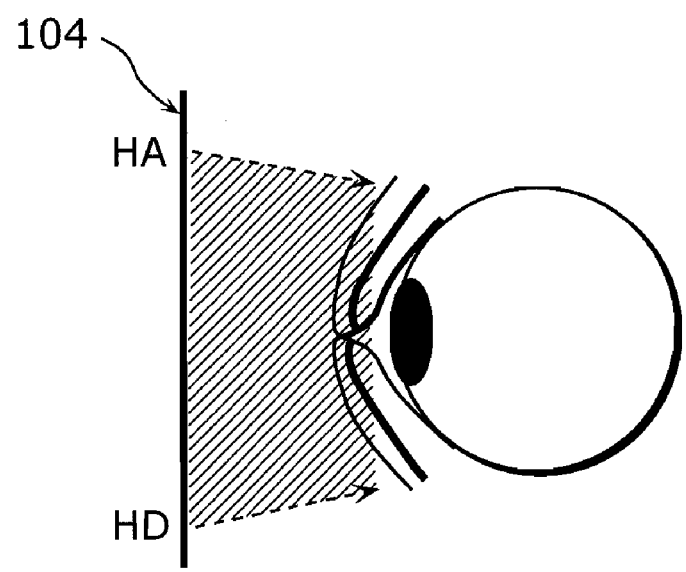
FIG. 9 is a diagram showing an irradiation range of an infrared beam when the eyelids are closed.

When the eyelid opening rate X becomes 0, it is judged that the user's eyelids are completely closed. At the time, the infrared-irradiation range control unit 602 matches the positions of HB and HC. FIG. 9 shows an example of infrared-beam irradiation to the eyelids at this time.

Note that in the present embodiment the positions of HA and HD are fixed, but this is not the only case; the positions of HA and HD may also be changed. For example, the position of HA may also be shifted in an identical direction by an identical amount according to the up-and-down movement in the position of HB. Likewise, the position of HD may also be shifted in an identical direction by an identical amount according to the up-and-down movement in the position of HC. With this, it is possible to keep a wider region on the eyelids, onto which the infrared beam is projected.

Note that the values of DU and DD are identical in the present embodiment, but the respective values may also be set to different lengths. In this case, processing such as setting the lengths of DU and DD according to the ratio of the upper-eyelid size to the lower-eyelid size is performed. In this case, even when the upper and lower eyelids are different in size, it is possible to change the infrared irradiation range appropriately.

In addition, a method by which the user directly specifies the irradiation range for upper and lower eyelids through a user interface of the HMD may also be employed. In this case, it is possible to change the infrared-beam irradiation range according to the characteristics of each user's eyelids (size and opening degree).

(Step S703 Determining an Infrared Irradiation Method)

In this step, the infrared-irradiation method control unit 603 determines an infrared-beam irradiation method within the irradiation range that has been determined by the infrared-irradiation range control unit 602 in the previous step.

Figure 10A:
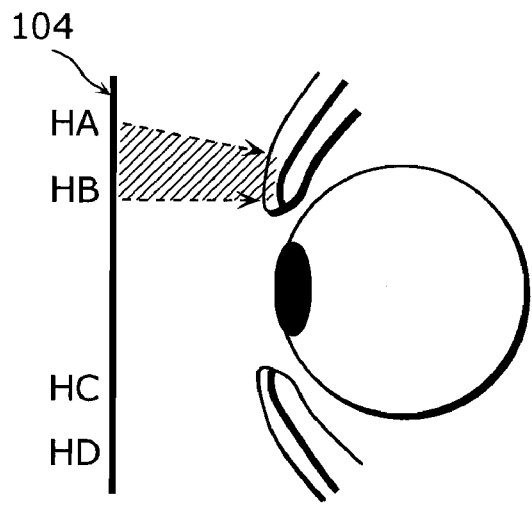
FIG. 10A is a diagram showing a state in which only an upper eyelid is irradiated with an infrared beam.
Figure 10B:
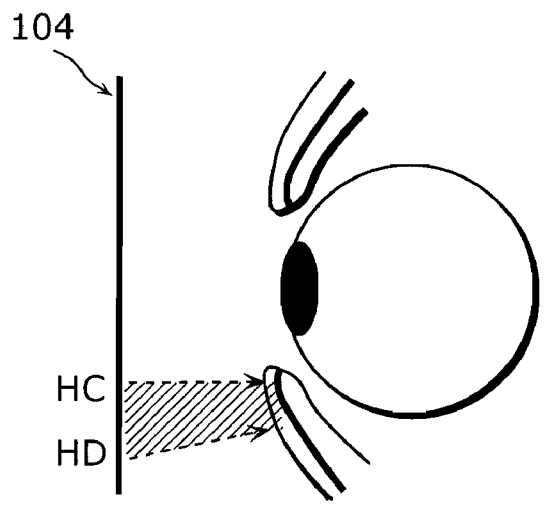
FIG. 10B is a diagram showing a state in which only a lower eyelid is irradiated with an infrared beam.

Since infrared beams give heat to human skin, it is not preferable, in some cases, to continue irradiating the same spot for a long time. To deal with such a case, the present embodiment adopts a method for switching spots irradiated with infrared beams at regular time intervals, even within the infrared irradiation range. FIGS. 10A and 10B show an exemplary method of infrared-beam irradiation in the present embodiment. In this example, the irradiation to upper and lower eyelids is switched at regular time intervals. Such an irradiation method, when adopted, prevents eyelids from being irradiated with infrared rays for a long time.

Figure 11A:
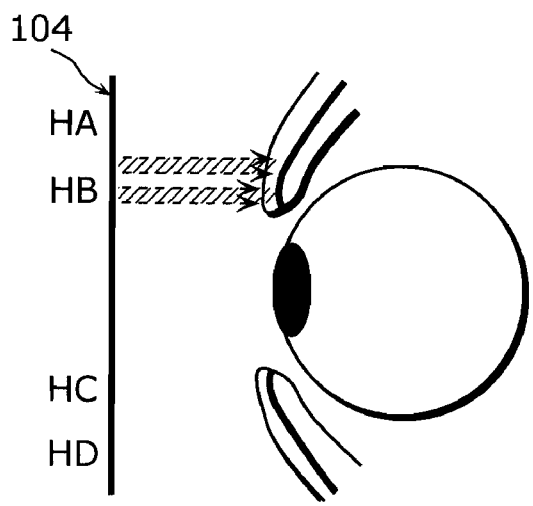
FIG. 11A is a diagram showing a state in which the irradiation range is divided into plural lines, only part of which are irradiated with an infrared beam.
Figure 11B:
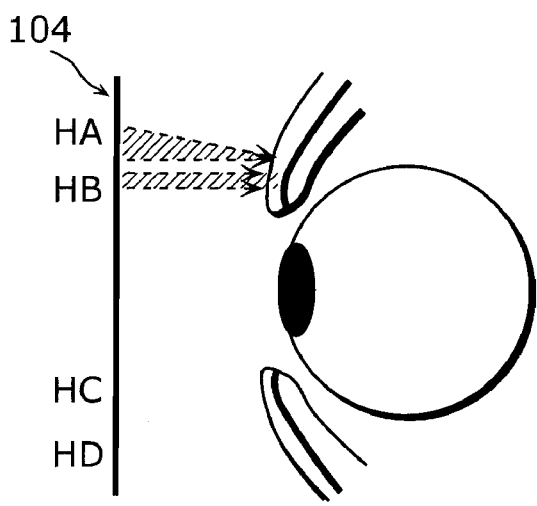
FIG. 11B shows a diagram showing a state in which lines different from the lines in FIG. 11A are irradiated with an infrared beam.

Note that the infrared-beam irradiation method is not limited to the methods shown in FIGS. 10A and 10B; for example, the irradiation method shown in FIGS. 11A and 11B may also be employed. In this example, the infrared irradiation range is divided in plural lines in a vertical direction, by switching, at regular time intervals, between the irradiation of an infrared beam to a region corresponding to an odd line and the irradiation of an infrared beam to a region corresponding to an even line. In this case, it becomes possible to prevent continuous irradiation of the infrared beam to the same spot for a long time while continuously irradiating the upper and lower eyelids with the infrared beam.

The infrared irradiation method control unit 603 determines the method of infrared-beam irradiation within the infrared irradiation range by adopting either one of the irradiation patterns described above or a combination of both.

Figure 12:
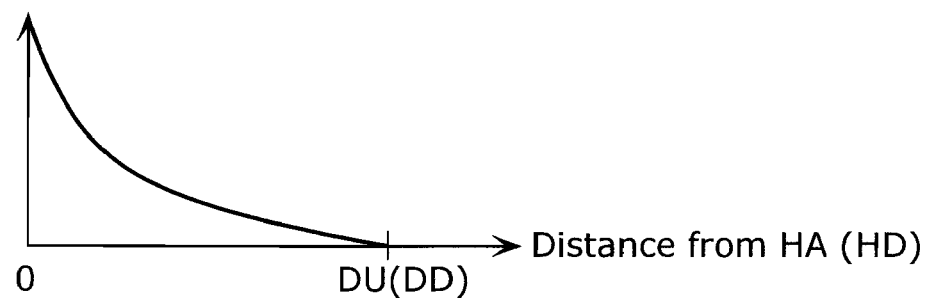
FIG. 12 is a diagram showing the relationship between the point of irradiation to eyelids and the intensity of an infrared beam.

Note that the infrared-irradiation method control unit 603 may also change the intensity of the infrared beam according to the position of the eyelid to be irradiated with the beam. FIG. 12 shows an exemplary relationship for changing the intensity of the infrared beam according to the position on the deflection unit 104. By using this relationship, it is possible to decrease, for the infrared beam projected onto the upper eyelid, the intensity of the infrared beam when the distance from HA shown in FIG. 8 is larger. By using this relationship, it is possible to decrease, for the infrared beam projected onto the lower eyelid, the intensity of the infrared beam when the distance from HD shown in FIG. 8 is larger.

With such processing being performed, the intensity of the infrared-beam output becomes weaker for the infrared beam nearer to an eyelid edge (the border on the pupil). As a result, even when an infrared beam is incident on the eye due to a rapid change in the open-and-closed state, the intensity of the infrared-beam output incident on the eyeball is controlled, thereby making it possible to prevent damage to the retina and so on.

Figure 13A:
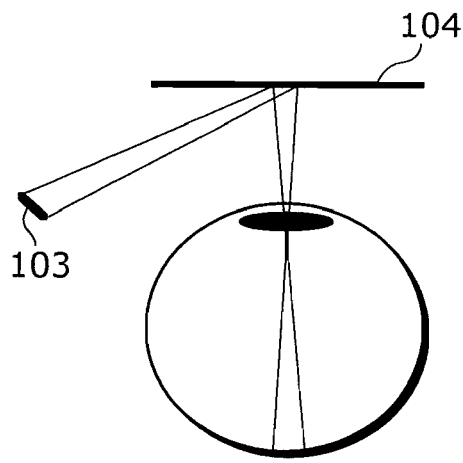
FIG. 13A is a diagram showing the state in which an infrared beam incident on the eyeball is not focused on the retina.
Figure 13B:
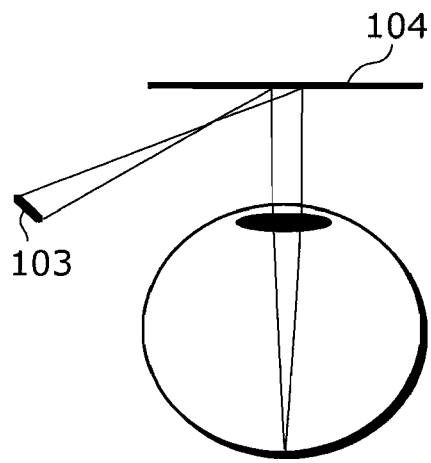
FIG. 13B is a diagram showing the state in which an infrared beam incident on the eyeball is focused on the retina.

In addition, the infrared irradiation method control unit 603 may change the wavefront shape of the infrared beam. FIGS. 13A and 13B show horizontal cross-sectional views of the HMD and the user's eyeball shown in FIG. 1. As FIG. 13B shows, when the beam from the deflection unit 104 becomes parallel, there are some cases where the beam is focused on the retina due to the light focusing effect of the eye. An infrared beam, when focused on the retina, may give a strong heat effect on the retina. For this reason, as FIG. 13A shows, the infrared irradiation method control unit 603 determines the wavefront shape of the infrared beam so as to prevent an image from being formed on the retina even when the infrared beam is incident on the eyeball. The wavefront shape, determined by the infrared-irradiation method control unit 603 with respect to the infrared beam, is notified to the wavefront shape converting unit 102, and the wavefront shape of an actual infrared beam is changed.

(Step S704 Controlling Infrared Beams)

In this step, control is performed on the light source 101 and the wavefront shape converting unit 102 in order to implement the infrared-beam irradiation range and irradiation method determined in the preceding steps.

It is possible, by performing the above-described steps from S701 to S704, to change the irradiation position of an infrared beam according to the open and closed states of the user's eyelids, and to selectively irradiate the user's eyelids with the infrared beam. As a result, it becomes possible to safely stimulate the meibomian glands in the eyelids during the VDT operation, thereby preventing dry eyes.

Note that the present embodiment shows exemplary processing to the left eye, but the same processing may be performed on the right eye. In this case, it is possible to prevent dry eyes for both eyes.

In addition, in the present embodiment, the processing on the binocular HMD shown in FIG. 1 has been described, but the same processing can also be performed on a monocular HMD.

Second Embodiment 2

HUD Configuration

Figure 14:
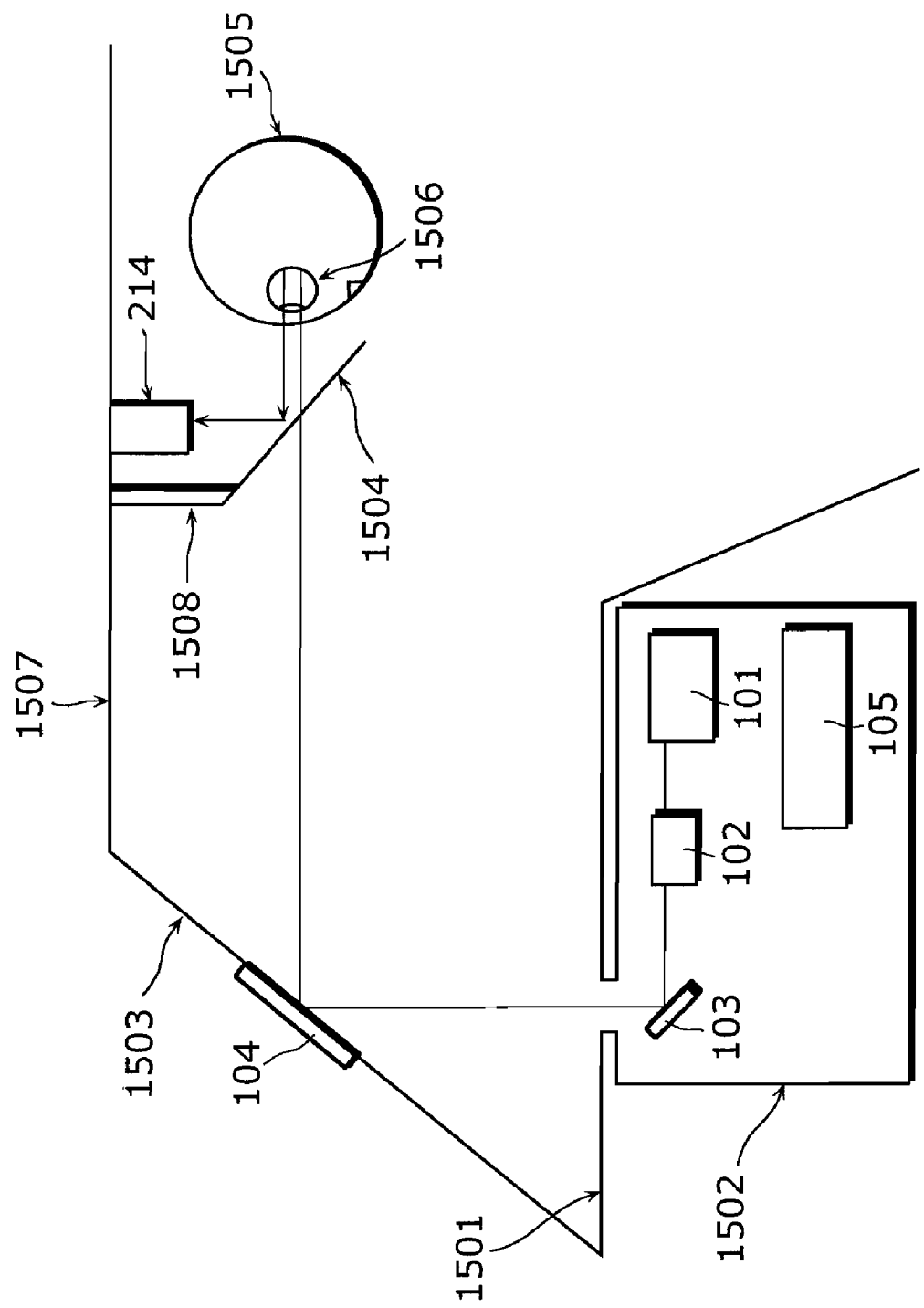
FIG. 14 is a configuration diagram of a beam-scan display apparatus in a second embodiment of the present invention.

FIG. 14 shows a configuration diagram (side view) of a laser-scan head-up display (HUD) in a second embodiment of the present invention.

A laser scan unit 1502 is embedded in a vehicle 1501. The laser scan unit 1502 is provided below a windshield 1503 of the vehicle 1501 (inside the instrument panel in the present embodiment) for scaling down the display apparatus.

Note that the laser scan unit 1502 may be provided outside the instrument panel, instead of being provided inside the instrument panel. In this case, the replacement or positional change of the laser scan unit 1052 is easier.

The light projected by the laser scan unit 1502 is deflected by the deflection unit 104 mounted on the windshield 1503, passing through a half mirror 1504 to reach an eyeball 1506 of a driver 1505, and thereby an image is visually recognized.

With such an HUD, it is possible to see map information or warning information displayed by the laser scan unit 1502 while recognizing an external landscape through the windshield 1503. As a result, safety and convenience for the driver 1505 can be improved.

Note that the reflected light of a laser beam projected on the user's retina is reflected by the half mirror 1504 provided in front of the user's eyes, to be sensed by the light sensing unit 214.

Figure 15:
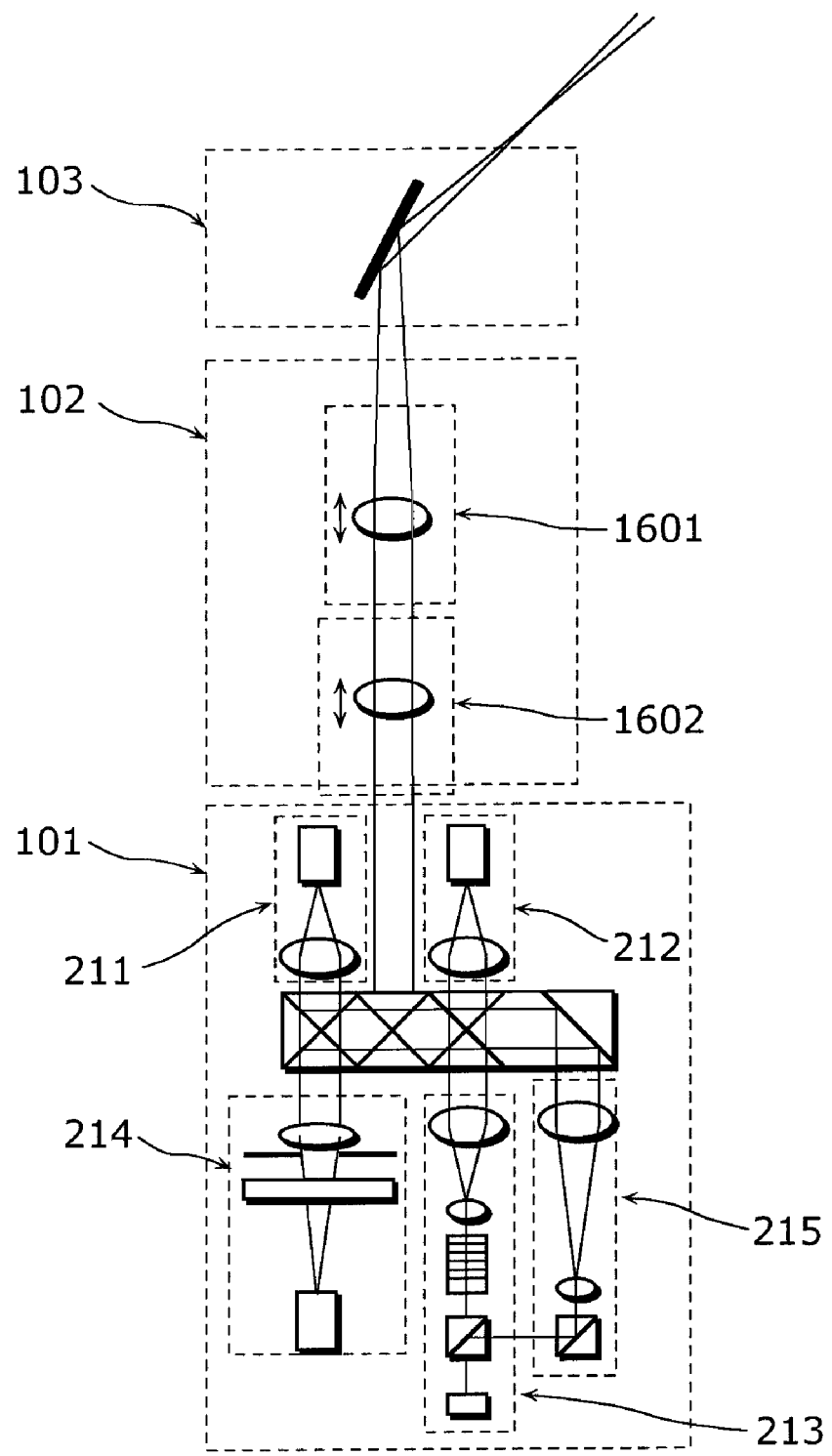
FIG. 15 is a detail configuration diagram of the beam-scan display apparatus in the second embodiment of the present invention.

The laser scan unit 1502 includes: a light source 101, a wavefront shape converting unit 102, a scan unit 103, and a control unit 105. FIG. 15 shows an exemplary configuration of the light source 101, the wavefront shape converting unit 102, and the scan unit 103 in the present embodiment.

The light source 101 in the second embodiment, as in FIG. 2 of the first embodiment, includes: a red laser source 211, a blue laser source 212, a green laser source 213, and an infrared laser source 215.

Note that the light sensing unit 214 in the present embodiment is not included in the light source 101, but is provided, as FIG. 14 shows, on a ceiling 1507 in the vehicle. With this configuration, it is possible to reduce the distance from the user's retina to the light sensing unit 214, thereby facilitating the sensing of the reflected light.

The wavefront shape converting unit 102 shown in the second embodiment has a focal length horizontal component converting unit 1601 and a focal length vertical component converting unit 1602 arranged in series in an optical path. This makes it possible to separately convert the horizontal and vertical curvatures of the beam. The focal length horizontal component converting unit 1601 and the focal length vertical component converting unit 1602 in the present embodiment convert the horizontal and vertical curvatures by varying the position of the cylindrical lens.

Note that, as shown in FIG. 2 in the first embodiment, the focal length horizontal component converting unit 1601 and the focal length vertical component converting unit 1602 may also convert the wavefront shape by combining the cylindrical lens and a mirror and changing the position of the mirror. In this case, it becomes possible, by oscillating the mirror at high speed, to appropriately convert the wavefront shape even for displaying an image having high resolution and a moving picture having a high frame rate.

In addition, the deflection unit 104 in the present embodiment is implemented with a transmissive hologram. The deflection unit 104 in the present embodiment is manufactured by: for example, forming a photopolymer layer on the inner surface of the windshield 1503 (on the interior side of the vehicle), and then forming a lippmann volume hologram on the photopolymer layer, so as to allow diffracting and focusing of a beam from the scan unit 103 onto the pupils of the user's eyes.

On the photopolymer layer, three holograms may be multiply-formed which reflect lights from the respective light sources of red, green, and blue, or a trilayer hologram corresponding to lights of the respective colors may also be laminated. In addition, it is possible to provide a transmissive display by manufacturing such that: only the lights having a wavelength of the light source is diffracted by using the wavelength selectivity of holograms, and the lights accounting for the major part of the light from the external world and having wavelengths other than the wavelength of the light source are not diffracted.

Note that the deflection unit 104 may also be freely detachable and attachable to the windshield 1503. In this case, when showing images on the display is not necessary, it is possible, by removing the deflection unit 104, to maintain the transmissivity of the windshield 1503 and increase the safety of the driver 1505.

Note that the deflection unit 104 may deflect the light from the scan unit 103 to both eyes of the user, instead of deflecting the light to either one of the eyes of the user. In this case, it becomes possible to display an image on both eyes of the user using a single deflection unit 104.

In the present embodiment, with the half mirror 1504 being provided before the user's eyes, the reflected light from the user's retina is reflected to the light sensing unit 214. The half mirror 1504 is mounted on the ceiling 1507 of the vehicle 1501 with a support bar 1508. This configuration allows detection of the quantity of the light reflected off the user's retina without requiring the user to wear an apparatus on the head. Note that the half mirror 1504 and the light sensing unit 214 may be provided on the eyeglasses or the cap of the driver 1505, instead of being provided on the ceiling 1507 of the vehicle 1501. In this case, even when the head of the driver moves back and forth, the possibility of the head touching the half mirror 1504 is decreased, thereby improving the safety of the driver 1505.

The control unit 105 includes an integrated circuit that controls each unit of the HUD. The control unit 105 controls: laser output from the light sources 101 and 110, and the operations of the wavefront shape converting unit 102, the scan unit 103, and the light sensing unit 214.

The light sensing unit 214 in the present embodiment is provided on the ceiling 1507, and the control unit 105 is provided inside the instrument panel; however, communication between the light sensing unit 214 and the control unit 105 may be wired with cables running inside the vehicle 1501, or may also be wireless.

In the present embodiment, the beam-scan display apparatus shown in FIG. 14 performs steps from S701 to S704 shown in FIG. 14, so as to stimulate the meibomian glands while varying the irradiation range of the infrared beams. Note that the processing from steps S701 to S704 is the same as the first embodiment.

Note that FIG. 14 shows only one of the user's eyes; however, another set of the laser scan unit 1502, the deflection unit 104, and the light sensing unit 214 may be prepared so that the irradiation range of infrared beams is controlled with respect to both eyes.

Third Embodiment

Figure 16:
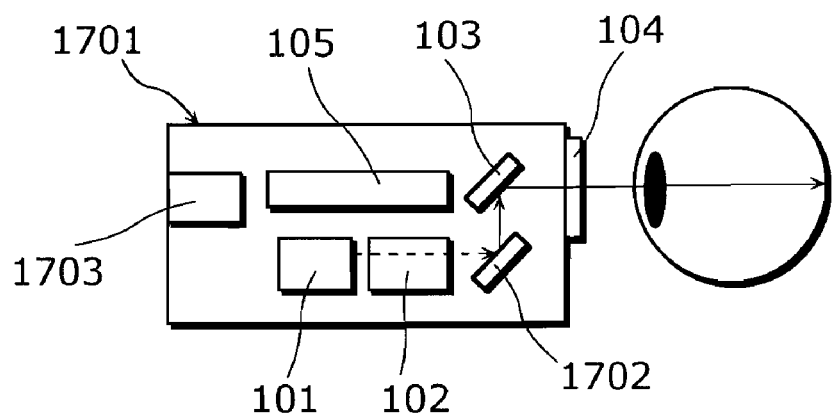
FIG. 16 is a configuration diagram of a beam-scan display apparatus in a third embodiment of the present invention.

FIG. 16 shows a configuration diagram (side view) of a laser-scan monocle 1701 in a third embodiment of the present invention.

The laser-scan monocle 1701 includes a camera 1703, allowing the user to visually recognize, by looking into the laser-scan monocle 1701, an image captured by the camera 1703 or an image from an external video apparatus connected to an external input terminal of the laser-scan monocle 1701. The configuration shown in FIG. 16 does not require, as with the HMD, the user to wear an apparatus on the head, allowing the user to readily use a beam-scan display apparatus outdoors.

The laser-scan monocle 1701 includes: a light source 101, a wavefront shape converting unit 102, a scan unit 103, a deflection unit 104, a control unit 105, a camera 1703, and a reflection mirror 1702.

The light source 101 in the third embodiment, as in FIG. 2 in the first embodiment, includes: a red laser source 211, a blue laser source 212, a green laser source 213, a light sensing unit 214, and an infrared laser source 215.

The wavefront shape converting unit 102 shown in the third embodiment has a focal length horizontal component converting unit 201 and a focal length vertical component converting unit 202 arranged in series in an optical path. This makes it possible to separately convert the horizontal and vertical curvatures of the beam. In the present embodiment, the vertical and horizontal conversion of wavefront shapes is performed by, as FIG. 2 shows, combining the cylindrical lens and a mirror and changing the position of the mirror. A beam from the wavefront shape converting unit 102, via the reflection mirror 1702, is projected by the scan unit 103 to be incident on the deflection unit 104.

The deflection unit 104 is an eyepiece lens provided on an eye piece of the laser-scan monocle 1701 and focuses the light from the scan unit 103 on the user's pupil. Note that the deflection unit 104 may also be a transmissive hologram instead of a convex lens. In this case, the eyepiece lens portion can be thinner, thereby allowing scaling down of the laser-scan monocle 1701.

The reflected light from the user's retina is sensed by the light sensing unit 214 after reversely traveling the same path as the incident light.

The control unit 105 includes an integrated circuit that controls each unit of the laser-scan monocle 1701. The control units 105 controls: laser output from the light sources 101 and 110, and the operations of the wavefront shape converting unit 102, the scan unit 103, the light sensing unit 214, and the camera 1703.

Figure 4:
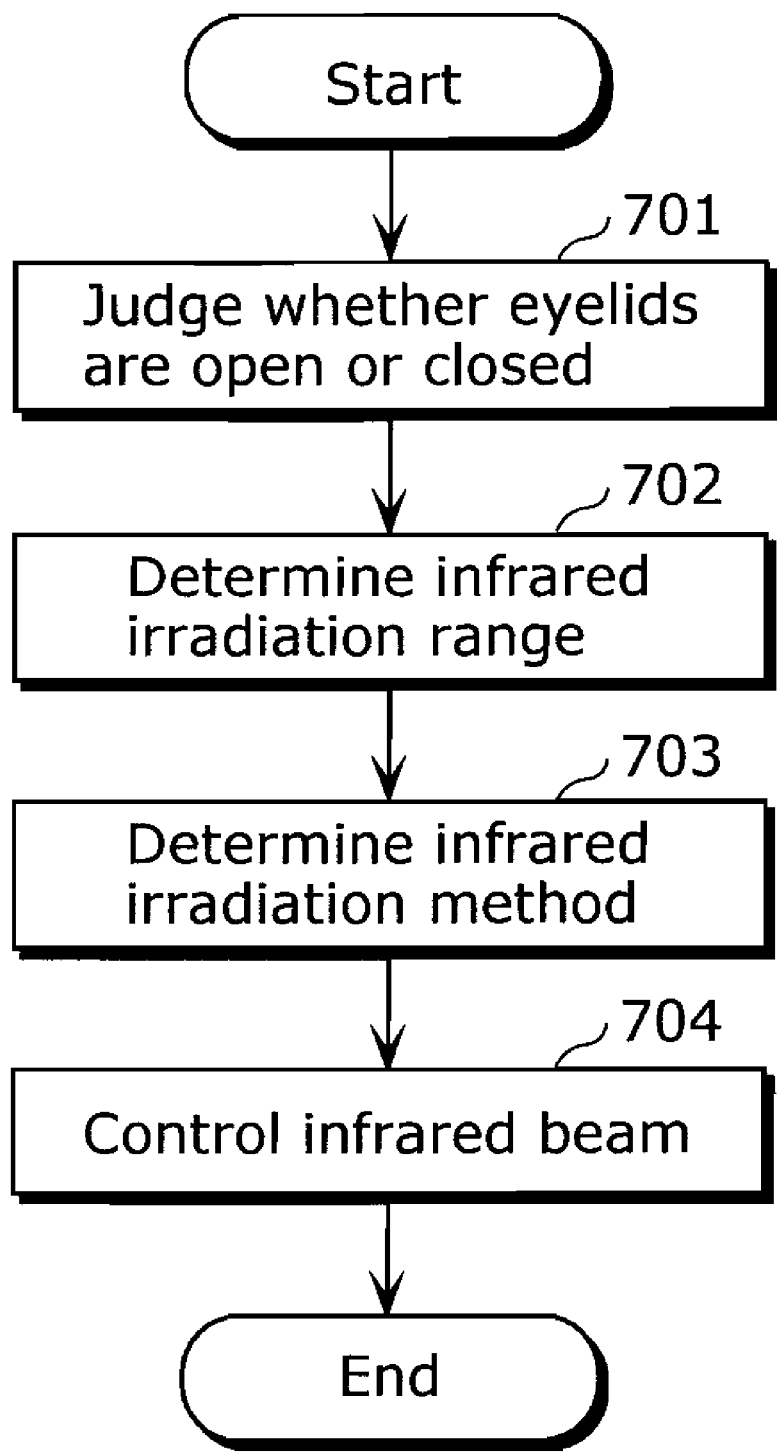
FIG. 4 is a flowchart of a process for infrared-beam irradiation onto eyelids in the first embodiment of the present invention.

In the present embodiment, the beam-scan display apparatus shown in FIG. 16 performs steps from S701 to S704 shown in FIG. 4, so as to stimulate the meibomian glands while varying the irradiation range of the infrared beam. Note that the processing from steps S701 to S704 is the same as the first embodiment.

Note that FIG. 16 shows only one of the user's eyes; however, another set of the light source 101, the wavefront shape converting unit 102, the scan unit 103, the deflection unit 104, and the light sensing unit 214 may be provided to form a binocular shape so that the irradiation range of infrared beams is controlled with respect to both eyes.

Note that in the case of forming a binocular shape, another applicable method is to use an identical light source 101 for displays on the right and left eyes and separate the beams outputted from the light source 101 using a prism and so on so that the separated beams enter, respectively, the wavefront shape converting unit 102 used for displays for the right and left eyes. In this case, the number of necessary light sources is reduced, thereby allowing scaling down of the binoculars as well as reducing power consumption.

Fourth Embodiment

Figure 17:
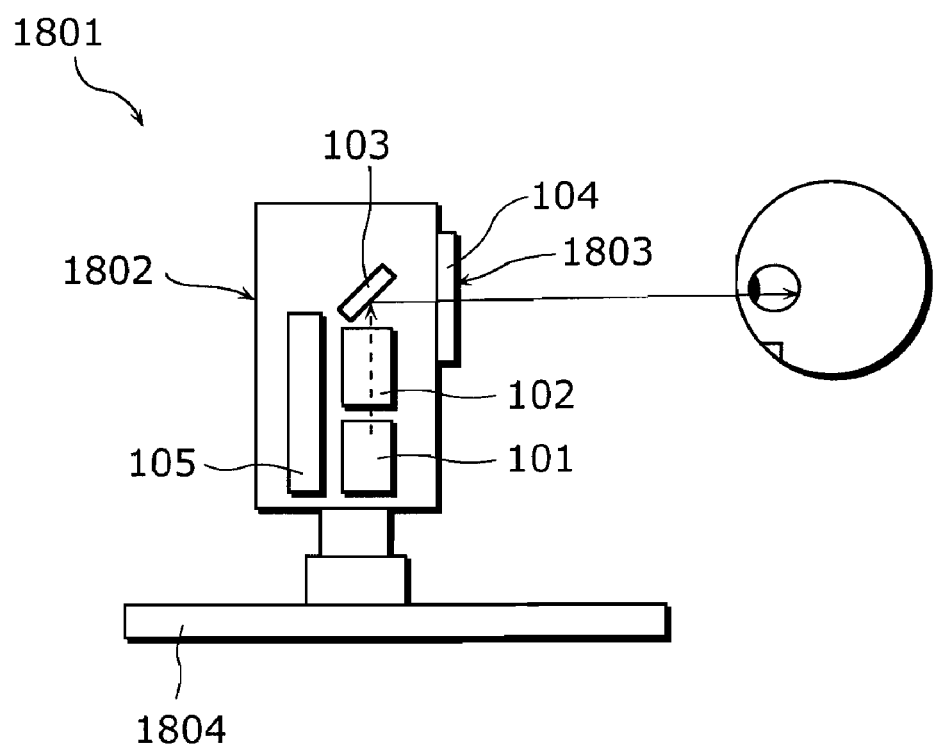
FIG. 17 is a configuration diagram of a beam-scan display apparatus in a fourth embodiment of the present invention.
Figure 18:
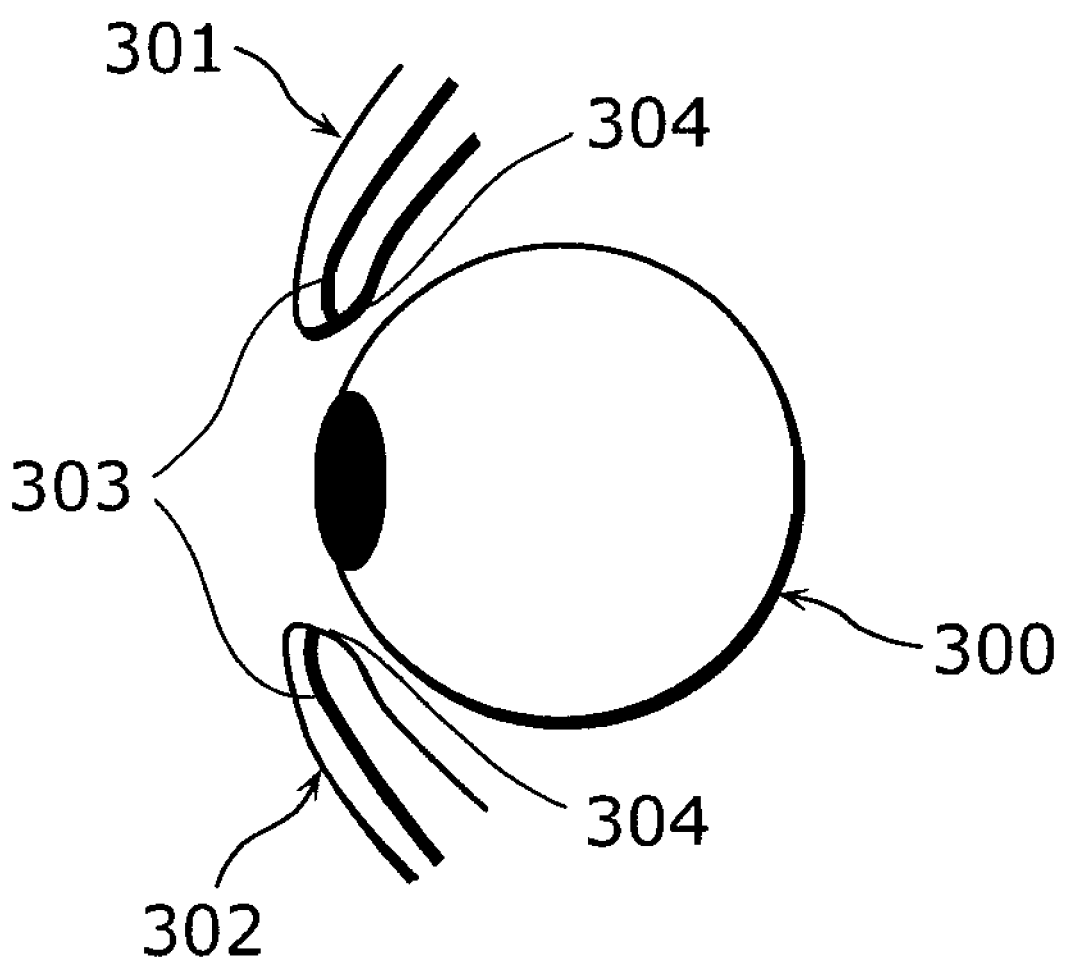
FIG. 18 is a cross-sectional view of the human eye structure.

FIG. 17 shows a configuration diagram (side view) of a stationary display 1801 of a laser-scan type in a fourth embodiment of the present invention.

The stationary display 1801 includes: a light source 101, a wavefront shape converting unit 102, a scan unit 103, a deflection unit 104, and a control unit 105. Specifically, included inside a case 1802 are: the light source 101, the wavefront shape converting unit 102, the scan unit 103, and the control unit 105, and provided on the surface of the case 1802 is a display surface 1803 constituted of a deflection unit 104.

Then, the user installs this stationary display 1801 on a desk 1804 for use. With the configuration shown in FIG. 17, the user need not wear an apparatus on the head as in the case of the HMD. In addition, since it is not necessary, unlike the laser-scan monocle 1701, to support the apparatus by hand for a long time, it becomes possible to use a stationary display 1801 for a long time without burden.

Note that the term "stationary" as described in the fourth embodiment merely indicates the use of the display placed on the desk 1804, not indicating the use with the user wearing the display as shown in the first and third embodiments, and so on. That is, it should be understood that the term includes not only a large display that is fixed to be used at a certain point but also a small display that is readily portable by the user.

In addition, this stationary display 1801 can also be used in an arbitrary form, not only by the placement on the desk 1804, the floor, and so on. For example, the display may be used by fixing on the wall and so on.

The light source 101 in the fourth embodiment, as in FIG. 2 of the first embodiment, includes: a red laser source 211, a blue laser source 212, a green laser source 213, a light sensing unit 214, and an infrared laser source 215.

The wavefront shape converting unit 102 in the fourth embodiment has a focal length horizontal component converting unit 201 and a focal length vertical component converting unit 202 arranged in series in an optical path. This makes it possible to separately convert the horizontal and vertical curvatures of the beam. In the present embodiment, the vertical and horizontal conversion of wavefront shapes is performed by, as FIG. 2 shows, combining a cylindrical lens and a mirror and varying the position of the mirror.

The beam from the wavefront shape converting unit 102 is projected by the scan unit 103 to be incident on the deflection unit 104.

The deflection unit 104 in the present embodiment is implemented with a transmissive hologram. The deflection unit 104 in the present embodiment is provided on the surface of the stationary display 1801 and focuses the light from the scan unit 103 on the user's pupil.

The reflected light from the user's retina can be sensed by the light sensing unit 214 after reversely traveling the same path as the incident light.

The control unit 105 includes an integrated circuit that controls each unit of the stationary display 1801. The control unit 105 controls: the laser output from the light source 101, and the operations of the wavefront shape converting unit 102, the scan unit 103, and the light sensing unit 214.

In the present embodiment, the beam-scan display apparatus shown in FIG. 17 performs steps from S701 to S704 shown in FIG. 4, so as to stimulate the meibomian glands while varying the irradiation range of the infrared beams. Note that the processing from steps S701 to S704 is the same as the first embodiment.

Note that FIG. 17 shows only one of the user's eyes; however, another set of the light source 101, the wavefront shape converting unit 102, the scan unit 103, the deflection unit 104, and the light sensing unit 214 may be prepared so that the irradiation range of infrared beams is controlled with respect to both eyes.

Note that another applicable method is to use an identical light source 101 for display for the right and left eyes and separate the beams outputted from the light source 101 using a prism and so on so that the separated beams become incident, respectively, on each wavefront shape converting unit 102 used for the display for the right and left eyes. In this case, the number of necessary light sources is reduced, thereby allowing scaling down of the binoculars as well as reducing power consumption.

Note that the control processing in each of the embodiments described above is implemented by causing a CPU to interpret and execute the predetermined program data that allows the execution of the above-described procedures stored in the memory (a ROM, a RAM, a hard disk, and so on). In this case, the program data may be introduced into the memory apparatus through a recoding medium, or may be directly executed from the recoding medium. Note that the recoding medium includes: a ROM, a RAM, and semiconductor memory such as flash memory, magnetic disk memory such as a flexible disk or a hard disk, an optical disk such as a CD-ROM, a DVD, and a BD, and a memory card such as an SD card. In addition, the recording medium is a concept including a communication medium such as a phone line and a carrier route.

In addition, it is possible to modify the embodiments of the present invention where appropriate without departing from the scope of the present invention. The embodiments of the present invention may naturally be combined for use.

INDUSTRIAL APPLICABILITY

The beam-scan display apparatus according to the present invention is applicable to: a display apparatus, a display system, a display method, a display program, and so on.

What is claimed is:

1. A display apparatus, comprising:
    a light outputting unit configured to output a visible beam to irradiate an eyeball with and an infrared beam to irradiate an eyelid with;
    a deflection unit configured to deflect, toward eyes of a user, the visible beam and the infrared beam outputted from said light outputting unit;
    a light sensing unit configured to sense reflected light of the visible beam that has been reflected off an eyeball of the user;
    an eyelid opening and closing judgment unit configured to judge whether eyelids of the user are in an open or closed state, based on a result of the reflected light sensing performed by said light sensing unit; and an infrared-irradiation range control unit configured to change an irradiation range of the infrared beam so that the eyelids are selectively irradiated with the infrared beam, by controlling said light outputting unit according to the open or closed state of the eyelids judged by said eyelid opening and closing judgment unit.

2. The display apparatus according to claim 1,
wherein said eyelid opening and closing judgment unit is configured to hold a relationship between a quantity of the reflected light and an eyelid opening rate indicating the open or closed state of the eyelids of the user, and to determine the eyelid opening rate based on the quantity of the reflected light sensed by said light sensing unit, and said infrared-irradiation range control unit is configured to change the irradiation range of the infrared beam in proportion to the eyelid opening rate determined by said eyelid opening and closing judgment unit.

3. The display apparatus according to claim 2,
wherein said infrared-irradiation range control unit is configured to fix an upper limit position of an upper irradiation range corresponding to an upper eyelid and a lower limit position of a lower irradiation range corresponding to a lower eyelid, and to change the irradiation range by shifting a lower limit position of the upper irradiation range and an upper limit position of the lower irradiation range.

4. The display apparatus according to claim 1, further comprising
an infrared-irradiation method control unit configured to determine a method for infrared-beam irradiation within the irradiation range determined by said infrared-irradiation range control unit, wherein said infrared-irradiation method control unit is configured to change, according to an irradiation position of the infrared beam, at least one of: intensity, a frequency of irradiation, and a wavefront shape of the infrared beam.

5. The display apparatus according to claim 4,
wherein said infrared-irradiation method control unit is configured to divide the irradiation range into an upper irradiation range corresponding to an upper eyelid and a lower irradiation range corresponding to a lower eyelid, and to alternately irradiate the upper irradiation range and the lower irradiation range with an infrared beam.

6. The display apparatus according to claim 4,
wherein said infrared-irradiation method control unit is configured to divide, into plural lines in a vertical direction, the irradiation range determined by said infrared-irradiation range control unit, and to alternately irradiate, with an infrared beam, an irradiation range corresponding to an odd line and an irradiation range corresponding to an even line.

7. The display apparatus according to claim 4,
wherein said infrared-irradiation method control unit is configured to convert the wavefront shape of the infrared beam according to a position at which the infrared beam is incident on said deflection unit, so as to prevent the infrared beam from being focused on one point.

8. The display apparatus according to claim 4,
wherein said infrared-irradiation method control unit is configured to decrease an infrared-beam output when a distance to a lower limit position of an upper irradiation range corresponding to an upper eyelid is smaller, and to decrease the infrared-beam output when a distance to an upper limit position of a lower irradiation range corresponding to a lower eyelid is smaller.

9. The display apparatus according to claim 1,
wherein said deflection unit is formed using a hologram that deflects an incident beam into a different direction according to a wavelength of the incident beam.

10. The display apparatus according to claim 1, comprising:
a light source which outputs a beam;
a wavefront shape conversion unit configured to convert a wavefront shape of the beam from said light source; and
a scan unit configured to project the beam from said wavefront shape conversion unit.

11. The display apparatus according to claim 10,
wherein said light source includes:
a red laser source which outputs a red laser;
a blue laser source which outputs a blue laser;
a green laser source which outputs a green laser by combining a semiconductor laser source and a wavelength conversion element, said semiconductor laser source outputting an infrared beam and said wavelength conversion element converting the infrared beam into the green laser; and
an infrared laser source which includes an optical branching unit that branches part of the infrared beam outputted from said semiconductor laser source, and which outputs an infrared beam.

12. A goggle-type head-mounted display, comprising:
the display apparatus according to claim 1;
a pair of lenses provided in front of the eyes of a user and each having the deflection unit on a side opposite to the eyes of the user; and
a pair of temples each having one end connected to a corresponding one of said pair of lenses and the other end fixed to a lateral side of the head of the user.

13. A vehicle, comprising:
the display apparatus according to claim 1; and
a windshield having the deflection unit.

14. A monocle, comprising:
the display apparatus according to claim 1; and
an eyepiece lens having the deflection unit.

15. A stationary display, comprising:
the display apparatus according to claim 1;
a case for housing said display apparatus; and
a display surface provided on a surface of said case and configured with the deflection unit.

16. A display method, comprising:
outputting a visible beam to irradiate an eyeball with and an infrared beam to irradiate an eyelid with;
deflecting, toward eyes of a user, the visible beam and the infrared beam outputted in said outputting;
sensing reflected light of the visible beam that has been reflected off an eyeball of the user;
judging whether eyelids of the user are in an open or closed state, based on the result of the reflected light sensing performed in said sensing; and
changing an irradiation range of the infrared beam so that the eyelids are selectively irradiated with the infrared beam according to the open or closed state of the eyelids judged in said judging.

17. A computer program recoded on a computer-readable recording medium, said computer program causing a computer to execute:
outputting a visible beam to irradiate an eyeball with and an infrared beam to irradiate an eyelid with;
deflecting, toward eyes of a user, the visible beam and the infrared beam outputted in said outputting;

sensing reflected light of the visible beam that has been reflected off an eyeball of the user;

judging whether eyelids of the user are in an open or closed state, based on a result of the reflected light sensing performed in said sensing; and changing an irradiation range of the infrared beam so that the eyelids are selectively irradiated with the infrared beam according to the open or closed state of the eyelids judged in said judging.

18. An integrated circuit, comprising:

a light outputting unit configured to output a visible beam to irradiate an eyeball with and an infrared beam to irradiate an eyelid with;

a deflection unit configured to deflect, toward eyes of a user, the visible beam and the infrared beam outputted from said light outputting unit;

a light sensing unit configured to sense reflected light of the visible beam that has been reflected off an eyeball of the user;

an eyelid opening and closing judgment unit configured to judge whether eyelids of the user are in an open or closed state, based on a result of the reflected light sensing performed by said light sensing unit; and an infrared-irradiation range control unit configured to change an irradiation range of the infrared beam so that the eyelids are selectively irradiated with the infrared beam, by controlling said light outputting unit according to the open or closed state of the eyelids judged by said eyelid opening and closing judgment unit.

* * * * *